(12) United States Patent
Ferman et al.

(10) Patent No.: US 12,387,419 B2
(45) Date of Patent: Aug. 12, 2025

(54) THREE-DIMENSIONAL LANDMARK LOCALIZATION

(71) Applicant: Flawless Holdings Limited, London (GB)

(72) Inventors: David Ferman, Jacksonville, FL (US); Pablo Garrido, Hawthorne, CA (US); Gaurav Bharaj, Santa Monica, CA (US)

(73) Assignee: Flawless Holdings Limited, London (GB)

( * ) Notice: Subject to any disclaimer, the term of this patent is extended or adjusted under 35 U.S.C. 154(b) by 138 days.

(21) Appl. No.: 18/538,662

(22) Filed: Dec. 13, 2023

(65) Prior Publication Data

US 2025/0200867 A1     Jun. 19, 2025

(51) Int. Cl.
*G06T 15/10*     (2011.01)
*G06T 7/73*      (2017.01)

(52) U.S. Cl.
CPC .............. *G06T 15/10* (2013.01); *G06T 7/73* (2017.01); *G06T 2200/04* (2013.01); *G06T 2207/30201* (2013.01); *G06T 2207/30244* (2013.01)

(58) Field of Classification Search
CPC ....... G06T 15/10; G06T 7/73; G06T 2200/04; G06T 2207/30201; G06T 2207/30244
USPC ....................................................... 345/419
See application file for complete search history.

(56) References Cited

U.S. PATENT DOCUMENTS 11,398,255 B1     7/2022 Mann et al.
11,830,159 B1    11/2023 Mann et al.

| 2019/0035149 | A1* | 1/2019 | Chen ..................... G06V 40/166 |
| 2020/0364509 | A1* | 11/2020 | Weinzaepfel ......... G06F 18/214 |
| 2023/0154032 | A1* | 5/2023 | Sinha ........................ G06T 7/70 |
| | | | 382/103 |
| 2023/0252662 | A1* | 8/2023 | Nikitidis ............... B29C 64/393 |
| | | | 382/103 |
| 2023/0316563 | A1* | 10/2023 | Greenspan ................ G06T 7/50 |
| | | | 382/103 |
| 2024/0320850 | A1* | 9/2024 | Yamazaki ................. G06T 7/73 |

(Continued)

OTHER PUBLICATIONS

Sun et al: "IDE-3D: interactive disentangled editing for high-resolution 3D-aware portrait synthesis" ACM Transactions on Graphics, vol. 41, Issue 6, Article No. 270, Dec. 2022.

(Continued)

*Primary Examiner* — David T Welch (74) *Attorney, Agent, or Firm* — EIP US LLP (57) ABSTRACT

A computer-implemented method includes rendering a plurality of two-dimensional views of a three-dimensional object generated by a generative model, using a two-dimensional landmark regressor to process the plurality of two-dimensional views to generate respective sets of two-dimensional landmarks, fitting a set of three-dimensional landmarks to the respective sets of two-dimensional landmarks. The method includes processing at least a first two-dimensional view of the object using a three-dimensional landmark regressor to determine a candidate set of three-dimensional landmarks for the first two-dimensional view of the object, and updating the three-dimensional landmark regressor based at least in part on a loss function comprising a term that evaluates a deviation between the candidate set of three-dimensional landmarks and the fitted set of three-dimensional landmarks.

20 Claims, 6 Drawing Sheets

(56) References Cited

U.S. PATENT DOCUMENTS

2024/0404104 A1* 12/2024 Revaud .................. G06V 20/70
2025/0131589 A1* 4/2025 Wei .......................... G06N 3/04

OTHER PUBLICATIONS

Ferman et al: "Multi-domain multi-definition landmark localization for small datasets" Computer Vision—ECCV 2022: 17th European Conference, Tel Aviv, Israel, Oct. 23-27, 2022.
Zheng et al: "General facial representation learning in a visual-linguistic manner" CVPR, Apr. 1, 2022.
Martyniuk et al: "Dad-3Dheads: A large-scale dense, accurate and diverse dataset for 3D head alignment from a single image" CVPR, Apr. 2022.
Wuu et al: "Multiface: A dataset for neural face rendering" CVPR, Jul. 22, 2022.
Wu et al: "Synergy between 3DMM and 3D landmarks for accurate 3D facial geometry", 3DV, Oct. 19, 2021.
Guo et al: "Towards fast, accurate and stable 3d dense face alignment" ECCV, Sep. 21, 2020.
Zheng et al: "3D-aware facial landmark detection via multiview consistent training on synthetic data" CVPR, 2023.
Bulat et al: "How far are we from solving the 2D & 3D face alignment problem? (and a dataset of 230,000 3D facial landmarks)" ICCV, Mar. 2017.
Chan et al: "Efficient geometry-aware 3D generative adversarial networks" CVPR, Dec. 15, 2021.
An et al: "Geometry-aware 3d full-head synthesis in 360°" CORR, Mar. 23, 2023.
Li et al: "3D human pose estimation from monocular images with deep convolutional neural network" ACCV, 2014.
Wood et al: "3D face reconstruction with dense landmarks" ECCV, Apr. 6, 2022.
Zheng et al: "3D human pose estimation with spatial and temporal transformers" ICCV, Mar. 18, 2021.
Li et al: "Multi-hypothesis transformer for 3d human pose estimation" CVPR, Nov. 24, 2021.
Zhang et al: "3D facial landmarks estimation in neural radiance fields" CoRR, Nov. 21, 2022.
Xie et al: "High-fidelity 3D Gan inversion by pseudo-multi-view optimization" CVPR, Nov. 28, 2022.
Kumar et al: "Estimating landmarks' location, uncertainty, and visibility likelihood" CVPR, Apr. 6, 2020.
Hempel et al: "6d rotation representation for unconstrained head pose estimation" ICIP, Feb. 25, 2022.

* cited by examiner

THREE-DIMENSIONAL LANDMARK LOCALIZATION

BACKGROUND OF THE INVENTION

Field of the Invention

The present disclosure relates to localizing three-dimensional landmarks within an image or video of an object. The disclosure has particular, but not exclusive, relevance to localizing three-dimensional facial landmarks.

Description of the Related Technology

Three-dimensional (3D) facial landmark localization plays an important role in various applications including talking head generation, 3D face reconstruction, and learning 3D face models. A context in which accurate 3D facial landmarks are valuable is visual dubbing or deep editing of films or television programs, for example as described in U.S. Pat. Nos. 11,398,255 and 11,830,159, the entireties of which are incorporated by reference for all purposes. In this context, a video processing pipeline may include fitting a controllable 3D morphable model (3DMM) to a sequence of video frames depicting a face, in which case 3D facial landmarks can be used to constrain vertices of the 3DMM and achieve a more accurate fit than using 2D landmarks alone. 3D landmarks can further be used for stabilizing an instance of a face over a sequence of video frames prior to processing by a neural renderer. In these ways, 3D landmark localization can be an important component of the visual dubbing or deep editing pipeline.

Machine learning methods for 3D facial landmark localization typically rely on supervised learning using training data comprising images labeled with 3D landmarks. However, obtaining ground truth 3D landmarks is generally not possible without highly expensive three-dimensional scanning hardware, and can only supply small non-diverse datasets. Unlike 2D landmark datasets for which accurate hand-labelling is possible (although expensive and time-consuming), there is no reliable method of obtaining ground truth 3D landmark labels for in-the-wild image or video data. To overcome these challenges, most existing 3D facial landmark datasets comprise synthetic images generated using 3DMMs. However, the 3D landmark labels in such datasets often lack alignment with 2D landmark definitions labeled by humans. For example, human-labeled 2D facial landmark datasets focus on the apparent brow boundaries, whereas 3DMM-based models define the brow region structurally above the eyes, as these correspond to fixed mesh vertices. The relationship between facial structure and brow appearance varies across identities, and hence, a 2D-3D inconsistency occurs. This, and other similar examples, lead to a noticeable ambiguity between 2D and 3D datasets which ultimately limits the usefulness of such datasets for a wide range of tasks.

SUMMARY

According to aspects of the present disclosure, there are provided a computer-implemented method, one or more non-transient storage media carrying instructions for carrying out the method, and a system comprising at least one processor and at least one memory storing instructions which, when executed by the at least one processor, cause the at least one processor to carry out the method.

The method includes rendering a plurality of two-dimensional views of a three-dimensional object generated by a generative model (each two-dimensional view corresponding to a respective camera pose relative to the three-dimensional object), using a two-dimensional landmark regressor to process the plurality of two-dimensional views to generate respective sets of two-dimensional landmarks, fitting a set of three-dimensional landmarks to the respective sets of two-dimensional landmarks using the respective camera poses. The method includes processing at least a first two-dimensional view of the object using a three-dimensional landmark regressor to determine a candidate set of three-dimensional landmarks for the first two-dimensional view of the object, and updating the three-dimensional landmark regressor based at least in part on a loss function comprising a term that evaluates a deviation between the candidate set of three-dimensional landmarks and the fitted set of three-dimensional landmarks.

Fitting the set of three-dimensional landmarks to the respective sets of two-dimensional landmarks across multiple views effectively "lifts" the two-dimensional landmarks to three-dimensions, resulting in three-dimensional pseudo-labels that exhibit 2D-3D consistency and are well-suited to be used as training data for the three-dimensional landmark regressor. The generative model may be, for example, a generative adversarial network (GAN), a neural radiance field (NeRF), implicit surfaces, such as Signed Distance Functions (SDF), or any other suitable model that may be absent a geometric prior that could otherwise introduce unwanted bias and/or 2D-3D inconsistencies.

The fitting may include, for a respective set of two-dimensional landmarks: using the respective camera pose to determine a subset of the respective set of two-dimensional landmarks that are unoccluded within the corresponding two-dimensional view of the object, and updating the three-dimensional landmarks based at least in part on a cost function which evaluates a deviation between the determined subset and projections of a corresponding subset of the three-dimensional landmarks. 2D landmark regressors typically label self-occluded regions, such as the far profile of a face, in a landmark-marched style, meaning that self-occluded landmarks adhere to a nearest visible boundary, and therefore do not correspond to 2D projections of 3D landmarks. Determining a subset of unoccluded 2D landmarks and limiting the cost function to this subset can mitigate detrimental effects on the fitting caused by this lack of correspondence.

The loss function may include a number of other terms which evaluate or penalize other metrics and may improve the efficiency and/or efficacy of training the three-dimensional landmark regressor. For example, a loss function term may evaluate a deviation between a candidate camera pose determined by the three-dimensional landmark regressor and a ground truth camera pose. Alternatively, or additionally, the method may include projecting the candidate set of three-dimensional landmarks to two dimensions using the candidate camera pose, and projecting the fitted set of three-dimensional landmarks to two dimensions using the ground truth camera pose. The loss function may then include a term that evaluates a deviation between the projected candidate set of three-dimensional landmarks and the projected fitted set of three-dimensional landmarks.

In another example, the object may be a first object, the candidate set of three-dimensional landmarks may be a first candidate set of three-dimensional landmarks, and the method may include processing a first image depicting a second object using the two-dimensional landmark regressor to determine a first set of two-dimensional landmarks, processing at least the first image using the three-dimensional landmark regressor to determine a second candidate set of three-dimensional landmarks and a candidate camera pose relative to the second object, and projecting the second candidate set of three-dimensional landmarks to two dimensions using the candidate camera pose. The loss function may then include a term that evaluates a deviation between the first set of two-dimensional landmarks and the projected second candidate set of three-dimensional landmarks. The at least first image may include one or more in-the-wild video frames, which can enable the training to benefit from a diversity of lighting, backgrounds, and other effects that may be absent from generative model samples, despite the video frame(s) not having known camera pose data that can be used to lift the first set of two-dimensional landmarks to 3D. Using real image data or video data alongside the rendered views in a self-supervised fashion can also be beneficial for cross-domain generalization, thereby breaching the gap between real and synthetic data.

In the example where a first image is processed, the method may include using the candidate camera pose to determine an unoccluded subset of the second candidate set of two-dimensional landmarks, and evaluating the deviation between the first two-dimensional landmarks and the projected second candidate three-dimensional landmarks uses the unoccluded subset of second candidate two-dimensional landmarks and a corresponding subset of the first two-dimensional landmarks. In this way, self-occluded landmarks, which may be landmark-marched, hallucinated, or otherwise unreliable, may be prevented from interfering with the training objective.

Rendering the plurality of two-dimensional views of the three-dimensional object may include sampling camera poses from a distribution that is biased towards camera poses corresponding to front-facing views of the three-dimensional object, or any other chosen type of camera pose. The pose distribution may be chosen for relevance to a given use case, such as visual dubbing or deep editing, in which substantially front-facing views are prevalent and desired to have a particularly high level of accuracy.

The method may include, after the updating of the three-dimensional landmark regressor, processing one or more images using the three-dimensional landmark regressor to determine a set of three-dimensional landmarks. The resulting 3D landmarks may then be used for downstream tasks, such as face and motion tracking or image/video stabilization within a visual dubbing or deep editing pipeline.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to three-dimensional (3D) landmark localization. In particular, embodiments described herein address challenges involved in obtaining high-quality 3D landmark datasets for training a 3D landmark regressor. A 3D landmark regressor may be a machine-learned model arranged to process an image (or a sequence of images) depicting an object to determine locations in a three-dimensional coordinate system of a set of landmarks associated with the object. The 3D landmark regressor may be capable of localizing landmarks for one or more classes of object, and the number and definition of landmarks may be predetermined for a given class of object. For example, landmarks for a human face may include around 100 points distributed along boundaries of the lips and eyebrows, around the eyes, along the ridge of the nose and the lower portion of the nose, and along the jawline. It will be appreciated that the definition of the 3D landmarks may vary for different 3D landmark regressors and may depend on the downstream task the 3D landmarks are needed for. For example, applications in which 3D landmarks are used for visual dubbing may include a relatively high density of 3D landmarks around the lips in order that locations of the 3D landmarks may capture fine-scale mouth movements.

Figure 1:
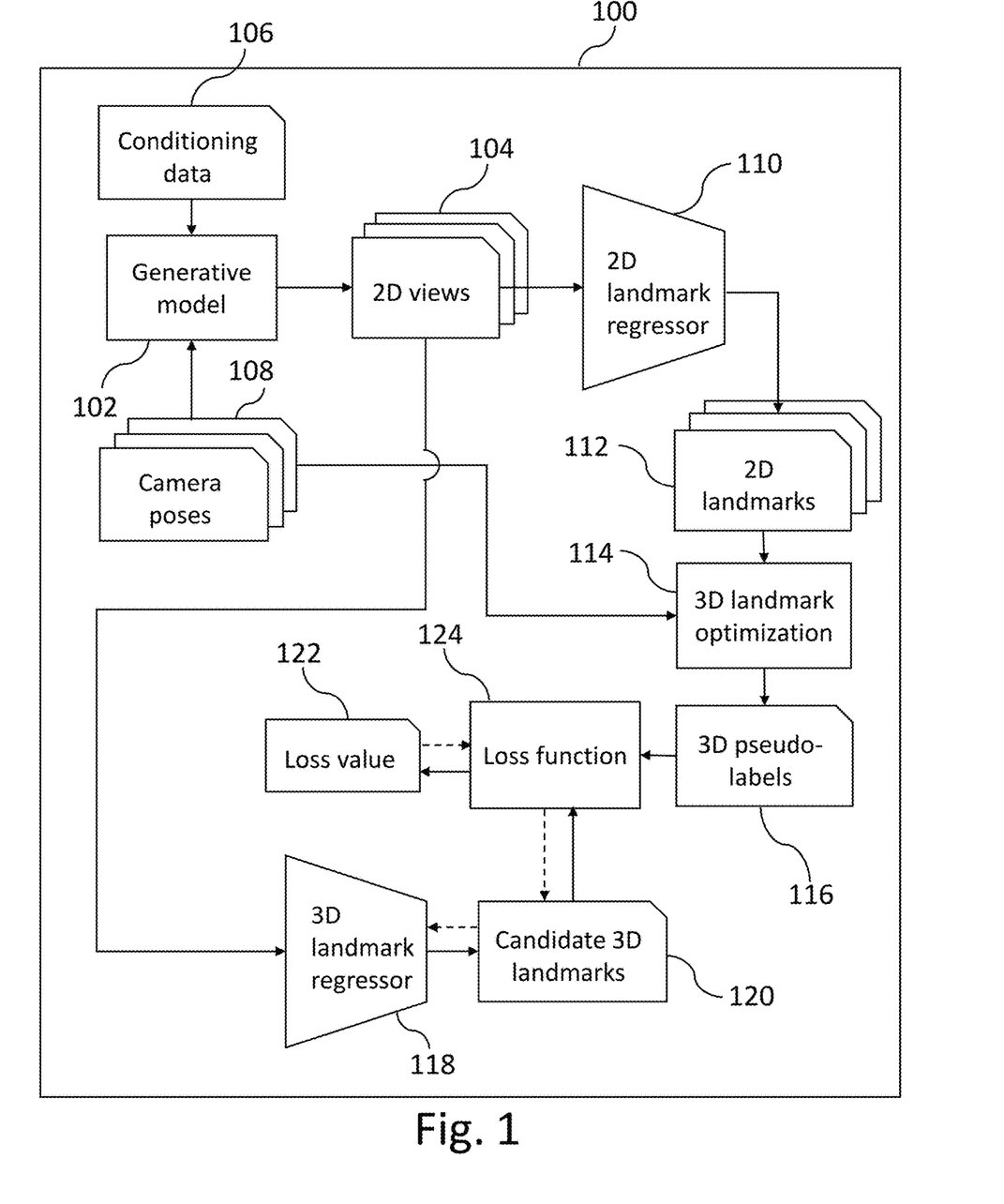
FIG. 1 is a functional block diagram representing functional components of a system for performing a method of training a 3D landmark regressor in accordance with examples.

FIG. 1 shows functional components or modules of a system 100 for training a 3D landmark regressor according to the present disclosure. The functional components may be implemented using at least one processor and at least one memory storing instructions to perform the various functions. For example, each functional component may correspond to a respective computer program or a respective part of a computer program. Example hardware and software implementations are described with reference to FIG. 6.

The system 100 stores data defining a generative model 102 arranged to render a set of 2D views 104 of a synthetic 3D object in dependence on conditioning data 106 and a set of camera poses 108. The generative model 102 may correspond to a probability density function over synthetic 3D objects conditioned on the conditioning data 106. A synthetic 3D object (also referred to simply as a 3D object in the present context) may result from drawing a sample from the generative model conditioned on the conditioning data 106, and may not necessarily correspond to any instance of a real physical object. The generative model 102 may have been pre-trained on a large number of images of real objects of one or more classes (for example, human faces) and may therefore hold an internal representation of features common to those images, including their arrangements in 3D. The generative model 102 may therefore be said to be 3D-aware. The generative model 102 may be implemented for example as a 3D-aware generative adversarial network (GAN), a neural radiance field (NeRF), or any other suitable implicit or explicit representation of a conditional probability density function as described above. An example of a suitable 3D-aware GAN for the present purpose is IDE-3D as presented in the article "IDE-3D: interactive disentangled editing for high-resolution 3D-aware portrait synthesis" by J. Sun et al, *TOG,* 2022, the entirety of which is incorporated by reference for all purposes.

The conditioning data 106 may include one or more of text data, image data, random noise, and/or any other data which can be provided to the generative model 102 to affect the properties of a sample (3D object) drawn from the generative model 102. In the case of human faces, the conditioning data 106 may determine the facial identity, the facial expression, lighting levels, other visual effects, and/or other characteristics of the 3D object that are independent of the camera pose. It is to be understood that generating a 3D object may correspond to fixing the conditioning data 106, but may not necessarily involve rendering or generating an output.

Each of the camera poses 108 may indicate a position and/or orientation of a virtual camera relative to a 3D object, from which a given 2D view is observed. In other words, each of the camera poses 108 may define a perspective from which a 2D view of the 3D object is rendered. The camera poses may be defined for example using a set of Euler angles and a translation. In one example, the camera pose may be defined by a camera extrinsic matrix $M \in SE(3)$, which may be parameterized by an azimuth angle $\alpha$, an elevation angle $\beta$, and a roll angle $\gamma$, along with a first translation vector t to take the camera to the surface a sphere centered at a look-at point, and a second translation vector $\Delta t$ which may move the camera away from the surface of the sphere. In cases where only a subset of orientations of the 3D object are of interest (for example, substantially front-facing orientations in the case of a human face), the angles may be restricted to limited ranges $\alpha \in [-A,A]$, $\beta \in [-B,B]$, $\gamma \in [-\Gamma,\Gamma]$ with suitable constants A, B, $\Gamma$, for example, A=110, B=60, $\Gamma$=90 for human faces where the angles are measured in degrees. The translation vector $\Delta t$ may also be restricted, for example such that the bounding box of projected landmarks is contained within the rendered 2D view and has minimum dimension greater than half of the image dimension. The set of camera poses 108 may be sampled randomly, for example from a distribution of camera poses that reflects the importance of different poses in the context of a particular task. In the case of human faces, camera poses may be sampled from a distribution that is biased towards front-facing. Alternatively, camera poses may be sampled uniformly and accepted with a non-uniform probability distribution, for example with probability $\exp(-\alpha^2/A^2 - \beta^2/B^2 - \gamma^2/\Gamma^2)$ to reduce the frequency of views with extreme rotation angle combinations. The rendered 2D views may also depend on additional parameters such as virtual camera intrinsic parameters, which may be represented by a camera intrinsic matrix $K \in \mathbb{R}^{3 \times 3}$.

The set of 2D views 104 are processed by a 2D landmark regressor 110 to determine, for each 2D view, a respective set of 2D landmarks 112. The 2D landmark regressor 110 may be any suitable model capable of localizing landmarks in 2D, such as that described in the article "Multi-domain multi-definition landmark localization for small datasets" in ECCV, Springer 2022 by two of the present inventors. The 2D landmark regressor 110 may be configured to determine 2D locations of a predetermined set of landmarks for the 3D object. In the event of a landmark being occluded (for example, self-occluded by the 3D object) the location may be landmark-marched and localized to a nearby visible boundary. Other 2D landmark regressors may work differently, for example by hallucinating occluded landmarks or by providing an indication that a given landmark is occluded as opposed to providing a location. In contrast with 3D landmark regressors, presently available 2D landmark regressors can be highly accurate and robust, at least in part due to the availability of high-quality labeled training data for such models.

Following the localization of the 2D landmarks for each of the 2D views 104, 3D landmark optimization 114 is carried out in which a corresponding set of 3D landmarks is fitted to the sets of 2D landmarks 112. This operation may be referred to as lifting the 2D landmarks to 3D. The lifting may be performed, for example, by projecting the set of 3D landmarks to a respective screen space corresponding to each of the 2D views using the respective camera poses 108, and backpropagating a cost function or reprojection error which penalizes deviations between the localized 2D landmarks and the projected 3D landmarks. In a specific example, the optimization is carried out over 225 epochs using the Adam optimizer with a learning rate starting at $10^{-5}$ and decaying exponentially by a factor of 0.9 every three epochs.

Figure 2:
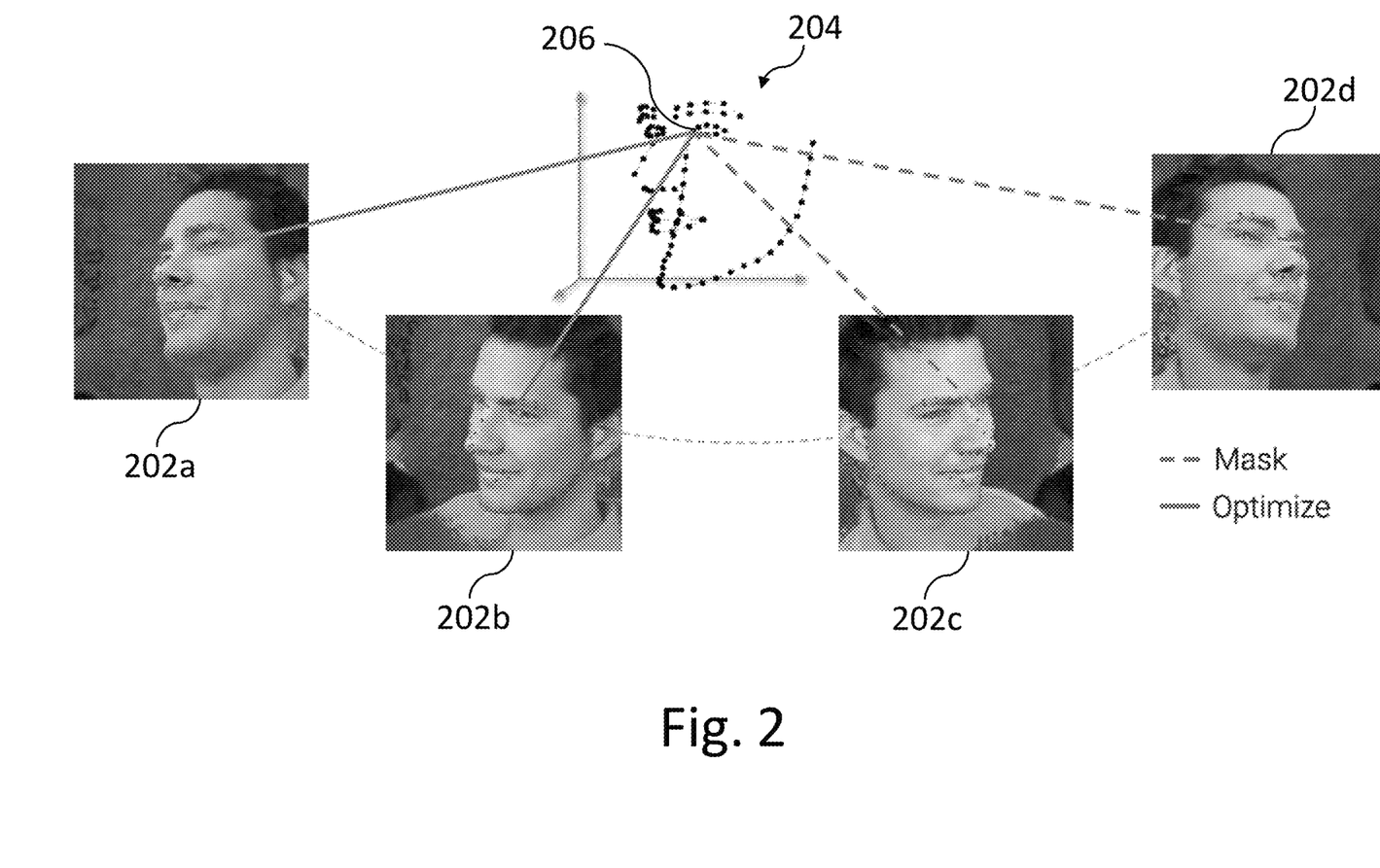
FIG. 2 illustrates an example of a set of 3D facial landmarks being fitted to a set of 2D views of a face.

The 3D landmark optimization 114 may be occlusion-aware, for example so that contributions to the reprojection error from 3D landmarks that are occluded due to the orientation of the 3D object for a given 2D view may be omitted. This may prevent the optimization from being impeded by erroneous contributions caused by landmark marching or other artifacts of landmarks being occluded in the 2D views. FIG. 2 shows an illustrative example of 2D views 202a, 202b, 202c, 202d of a human face synthesized by a 3D-aware GAN, along with a set of 3D facial landmarks 204. A 3D landmark 206 located at the corner of the eye closest to the nose is visible in the views 202a and 202b, but occluded by the nose in the views 202c and 202d. As a result, the optimization may use contributions comparing the 3D landmark 206 with corresponding 2D landmarks in the views 202a and 202b, but may omit contributions comparing the 3D landmark 206 with corresponding 2D landmarks in the views 202c and 202d (in other words, these 2D landmarks may be masked for the purpose of 3D landmark optimization).

The 3D landmarks resulting from the 3D landmark optimization 114 may be referred to as 3D pseudo-labels 116, as they can be used in place of ground truth 3D landmark labels for the purpose of training a 3D landmark regressor 118. The 3D landmark regressor 118 may be configured to localize a predetermined set of 3D landmarks, for example by determining offsets to a 3D landmark template. The 3D landmark regressor 118 may be configured to process individual images or sequences of images depicting an object. Configuring the 3D landmark regressor 118 to process sequences of images may enable the 3D landmark regressor 118 to reason over temporally neighboring 2D poses for temporally-aware lifting. The 3D landmark regressor 118 may be implemented using any suitable model. For example, the 3D landmark regressor 118 may be a 3DMM regression model which determines coefficients of a 3DMM. Alternatively, the 3D landmark regressor 118 may be implemented using a convolutional neural network (CNN) or other image processing network configured to generate 2D keypoints, along with a lifting network trained to lift or project those 2D keypoints to 3D. Further still, the 3D landmark regressor 118 may be implemented using a vision transformer (ViT).

Figure 3:
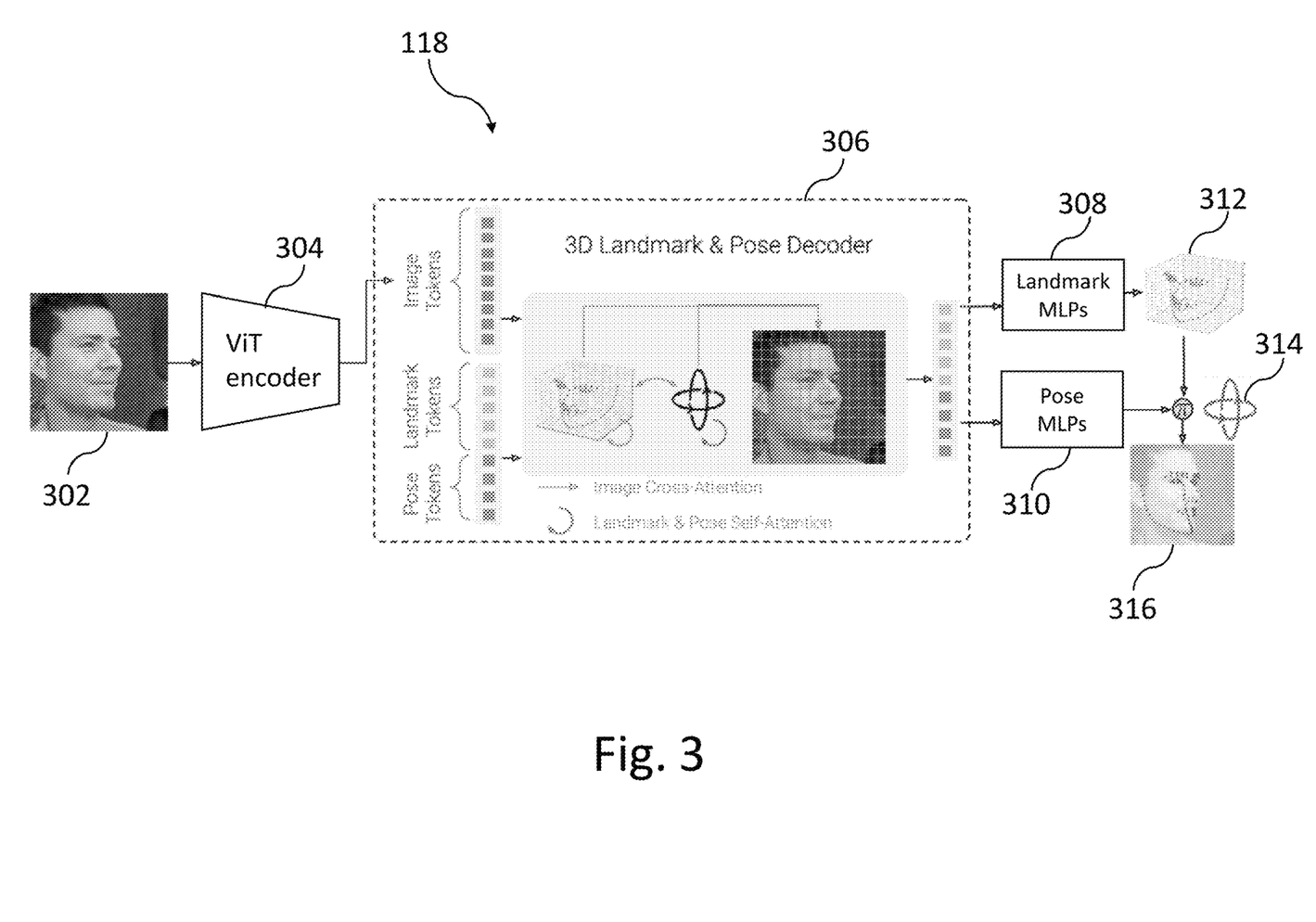
FIG. 3 schematically shows an example of a 3D landmark regressor suitable for training using the methods disclosed herein.

FIG. 3 shows an example implementation of the 3D landmark regressor 118 based on a ViT architecture. In this example, the 3D landmark regressor 118 includes a ViT encoder 304 which is arranged to process an image 304 (for example, a 2D view rendered by the generative model 102) to generate a set of image tokens corresponding to image path. The ViT encoder 304 may be pre-trained for the relevant domain, for example for human face perception tasks in the case of 3D facial landmark localization. An example of a suitable ViT encoder for this purpose is the FaRL encoder described in the article "General facial representation learning in a visual-linguistic manner", by Y. Zheng et al, *CVPR*, 2022, the entirety of which is incorporated by reference for all purposes.

The 3D landmark regressor 118 further includes a transformer-based 3D landmark and pose decoder 306. In addition to the image tokens generated by ViT encoder 302, the decoder 306 is configured to receive landmark and pose tokens initialized from a learned embedding. The landmark and pose tokens may include, for example, a token for each landmark, a token for rotation, and one or more tokens for translation. The tokens pass through one or more blocks each containing an image-cross attention layer by which the landmark tokens and pose tokens cross-attend to the image tokens, a landmark-pose self-attention layer which performs self-attention over a "sequence" of landmark and pose tokens, and a multi-layer perceptron (MLP), with (optionally) layer-normalization applied prior to each layer. The landmark tokens and the pose tokens are respectively routed to landmark MLP heads 308 and pose MLP heads 310 to predict 3D landmarks 312 and a 3D pose 314. The candidate 3D landmarks may be predicted as offsets to a template, which may be defined as the landmark-wise mean of the 3D pseudo-labels 116 obtained during 3D landmark optimization. The pose may be predicted using any suitable representation, for example via a 6D rotation representation and 3D translation vector from which the camera extrinsic matrix can be computed. The pose 310 may optionally be used to project the 3D landmarks 312 into the screen space of the image 302 to generate projected landmarks 316.

The training of the 3D landmark regressor 118 may proceed with obtaining one or more 2D views of the 3D object. The one or more 2D views may be identical to at least some of the 2D views 104 used for 3D landmark optimization (as shown in the figure), though this is not essential. The one or more 2D views are processed using the 3D landmark regressor 118 to determine a candidate set of 3D landmarks 120 for at least one of the 2D views. A loss value 122 is determined by evaluating a loss function 124 that penalizes a deviation, error, or difference between the candidate set of 3D landmarks 120 and the 3D pseudo-labels 116. The loss function 124 may for example include a term evaluating a mean-squared-error between the 3D pseudo-labels 116 and the candidate 3D landmarks 120. In order to evaluate the deviation, the candidate 3D landmarks 120 and/or the 3D pseudo-labels 116 may be transformed so that they are in a common reference frame to one another. The 3D landmark regressor 118 may be updated based at least in part on the loss value 122, for example by backpropagating the loss value 122 (as indicated by the dashed arrows) and updating the trainable parameters of the 3D landmark regressor 118 using gradient-based optimization.

The loss function 124 may optionally include one or more additional terms. For example, as described above the 3D landmark regressor 118 may determine a candidate camera pose (not shown) along with the candidate 3D landmarks 120. The loss function 124 may then include one or more terms evaluating a deviation, error or difference between the candidate camera pose and the ground truth camera pose from which the corresponding 2D view is rendered. The loss function 124 may for example include a first term evaluating a mean-squared error between the candidate translation $\Delta t$ and the ground truth translation, and a second term evaluating a geodesic loss between the candidate viewing angles $\alpha, \beta, \gamma$ and the ground truth viewing angles.

The candidate pose determined by the 3D landmark regressor 118 may be used to project the candidate 3D landmarks 120 to the screen space of the corresponding 2D view. Similarly, the ground truth camera pose may be used to project the 3D pseudo-labels 116 to the screen space of the 2D view. The loss function 124 may therefore also include a term evaluating a deviation, error, or difference between the projected candidate 3D landmarks and the projected 3D pseudo-labels. This loss function term may for example use a mean-squared error. Alternatively, the loss function term may correspond to absolute error, probabilistic error measurements, or an uncertainty-aware loss. In one example, the loss function term may correspond to a Laplacian Log Likelihood (LLL) objective parametrized by a predicted Cholesky factorization of landmark covariances, in which case the landmark MLP head 308 and the pose MLP head 310 may further be used to predict Cholesky factors of the 2D covariances of the 3D landmarks when projected to the screen space of the image 302. Such parameterization may enable the energy landscape to adapt to noise caused by rendering artifacts and may allow the model to weigh the loss for each landmark prediction based on its 2D anisotropic confidences, especially when modelling uncertainties, for example arising from real data.

The training described above may proceed for multiple iterations, for example until a stopping condition is satisfied, such as a convergence condition or after a predetermined number of iterations. It will be appreciated that the training may proceed in batches, with each training batch containing views of multiple 3D objects (for example 3, 4, 5, 10, or any other suitable number of 3D objects). The trained 3D landmark regressor 118 may then be ready to process images or sequences of images (for example, video data) to determine 3D landmarks to be used for downstream tasks, such as motion tracking or image stabilization within a visual dubbing or deep editing pipeline.

One potential shortcoming of using a generative model such as a 3D-aware GAN to generate training data for a 3D landmark regressor is that the generative model may be unable to render a sufficient diversity of visual characteristics, such as lighting conditions, blur, distortion, backgrounds features, etc., compared with in-the-wild video data or image data which the trained 3D landmark regressor will ultimately be used to process. To mitigate this issue, the 3D landmark regressor may be jointly trained on real images or video data alongside the rendered views of synthetic 3D objects. Since ground truth pose data is typically not available for real images or video frames, a different processing pipeline may be applied to the real images or video data, as described below.

Figure 4:
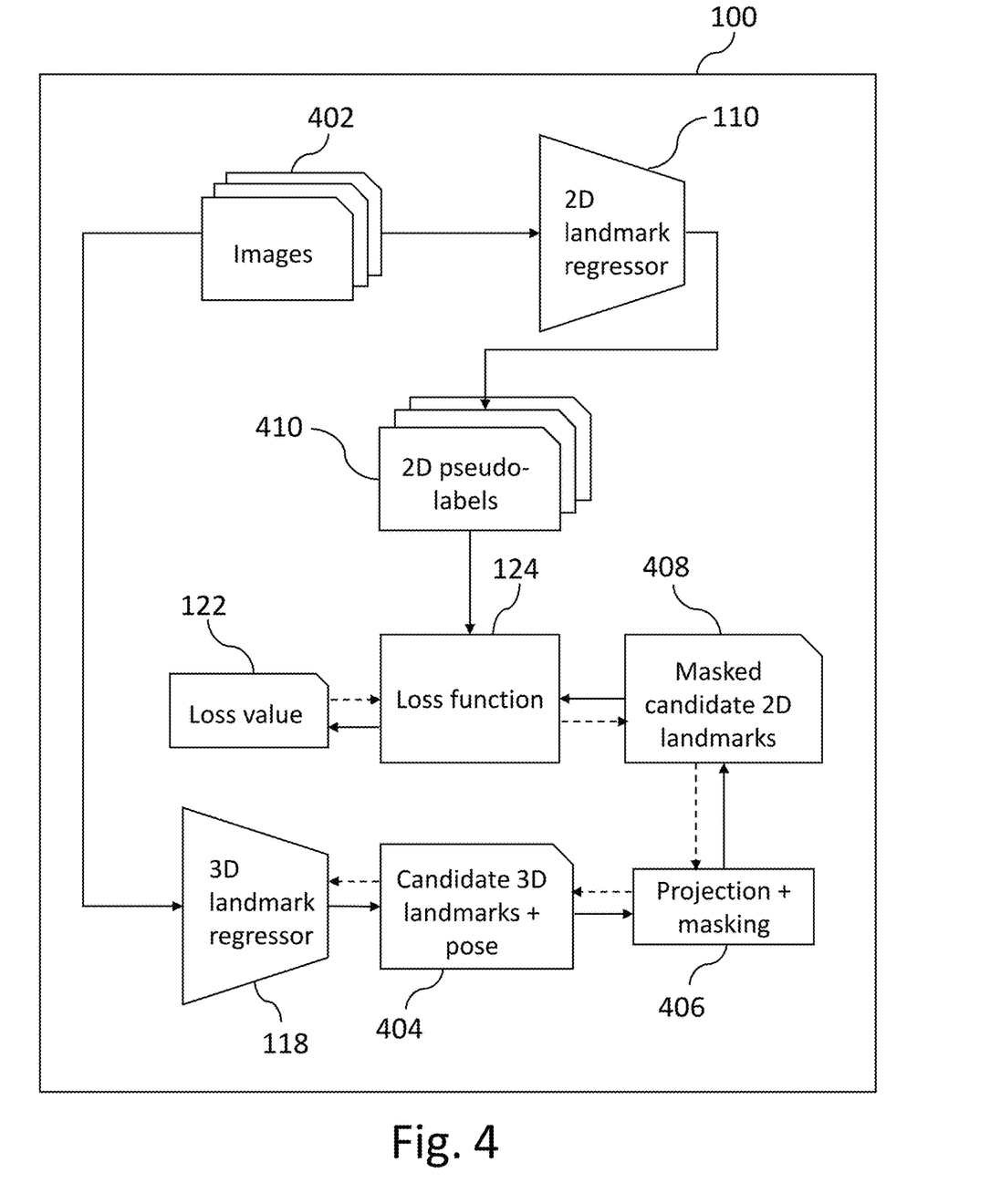
FIG. 4 shows optional additional functional components of the system of FIG. 1.

FIG. 4 shows optional additional components of the system 100 for implementing an image or video processing pipeline that may be used to improve the efficiency and/or efficacy of training the 3D landmark regressor 118. The pipeline processes a set of one or more images 402 all depicting a common object (such as a human face), which may be a real physical object in contrast with the synthetic 2D views described with reference to FIG. 1. The images 402 may for example be video frames sampled regularly, randomly, or otherwise, from in-the-wild video data. The images 402 may exhibit greater diversity than the 2D views rendered by the generative model 102 and may be free of any artifacts or biases introduced by the generative model 102.

The images 402 are processed using the 3D landmark regressor 118 to determine output data 404 including a set of candidate 3D landmarks and a candidate camera pose for at least one of the images 402. The output data 404 is used for projecting and masking 406, in which an unoccluded subset of the set of candidate 3D landmarks is identified and at least the unoccluded subset is projected to 2D using the candidate camera pose. The unoccluded subset may be indicated by a set of binary mask values $m \in \{0,1\}^N$, where N is the number of candidate 3D landmarks. The unoccluded subset may be a subset of landmarks that are not self-occluded by the 3D object itself, and may be identified, for example, by learning an implicit function that detects occlusion based on 3D head pose and orientation. In another example, the unoccluded subset may be identified using a template-based normal test, by defining a template of normal vectors for the candidate 3D landmarks, applying the rotation component of the candidate camera pose to the normal vectors, and thresholding the dot product of each normal vectors with a forward vector of the camera to determine which candidate 3D landmarks are self-occluded. Suitable thresholds may be determined for specific classes of object. For example, the inventors have found that for human faces, thresholds may be set so that dot products above around 0.5 are considered visible for most landmarks, whereas dot products above around −0.1 are considered visible for landmarks on the nose bridge (assuming all vectors are unit vectors). In a further example still, the unoccluded subset may be identified by applying a direct normal test from deformed landmarks. The result of the projecting and masking 406 is a set of masked candidate 2D landmarks 408.

In addition to being processed by the 3D landmark regressor 118, the one or more images 402 are processed using the 2D landmark regressor 110 to determine a corresponding one or more sets of 2D pseudo-labels 410. The 2D pseudo-labels may include landmark-marched pseudo-labels in the case of self-occlusions, and/or may include hallucinated pseudo-labels in the case of other occlusions. It may be desirable to maintain hallucinated pseudo-labels for training the 3D landmark regressor 118, particularly in cases where the 2D landmark regressor 110 is able to make reasonable estimates of such pseudo-labels, which can encourage similarly proficient estimating abilities in the 3D landmark regressor. By contrast, it may be undesirable to include landmark-marched pseudo-labels in the training process as these may introduce systematic biases in the 3D landmark estimation. Accordingly, the loss function 124 may include a term which evaluates a deviation, error, or difference between the set of masked candidate 2D landmarks 408 (corresponding to an unoccluded subset of the candidate 3D landmarks), and a corresponding subset of the 2D pseudo-labels 410. By augmenting the loss function 124 with such a term, the 3D landmark regressor 118 may be jointly trained on rendered views of synthetic 3D objects and images of real-world objects, enabling the 3D landmark regressor 118 learn to robustly localize 3D landmarks with 2D-3D consistency across visually diverse image or video datasets.

As mentioned above, the training of the 3D landmark regressor 118 may proceed with training batches each containing views of multiple 3D objects. In examples where the training uses real work images or video, each training batch may similarly include multiple image or video samples (for example 3, 4, 5, 10, or any other suitable number of samples).

Figure 5:
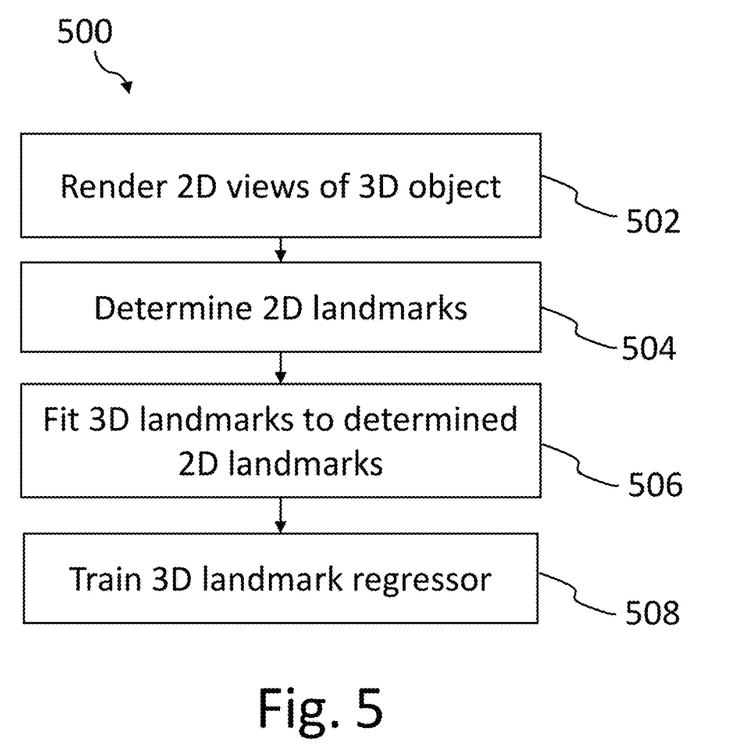
FIG. 5 is a flow diagram representing an exemplary method of training a 3D landmark regressor in accordance with the present disclosure.

The training process described herein is summarized by FIG. 5. The method 500 may proceed with rendering, at 502, a plurality of 2D views of a 3D object (such as a human face) generated by a generative model, each 2D view corresponding to a respective camera pose relative to the 3D object. The method 500 continues with determining, at 504 using a 2D landmark regressor, a respective set of 2D landmarks for each of the plurality of 2D views. The method 500 continues with fitting, at 506, a set of 3D landmarks to the respective sets of 2D landmarks using the respective camera poses. The fitting may use occlusion-aware optimization to avoid errors produced by landmarks being occluded in some of the 2D views. The method 500 concludes with training, at 508, a 3D landmark regressor using the fitted set of 3D landmarks and one or more 2D views of the object generated by the generative model. The training may include processing at least a first 2D view of the object using the 3D landmark regressor to determine a candidate set of 3D landmarks for the first 2D view, and updating the 3D landmark regressor based at least in part on a loss function comprising a term that evaluates a deviation between the candidate set of 3D landmarks and the fitted set of 3D landmarks. The loss function may optionally include additional terms as explained above. Furthermore, a training iteration may be based on a batch of multiple sets of 2D views, each set corresponding to a different 3D object.

Figure 6:
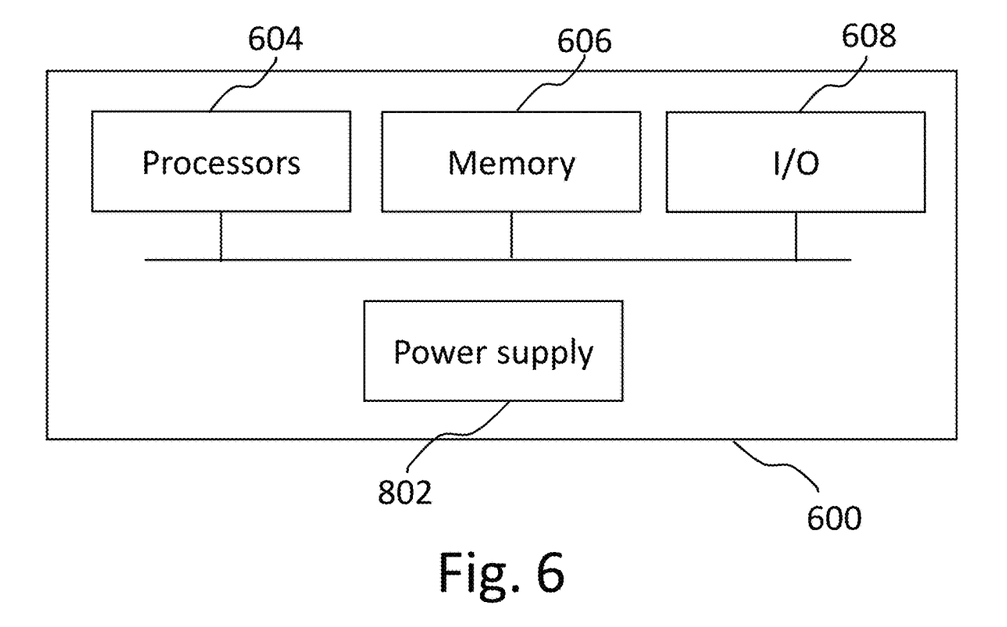
FIG. 6 is a schematic block diagram representing a system for performing methods described in the present disclosure.

The methods described herein may be performed using any suitable computing apparatus. For example, computing system 600 includes a power supply 602, one or more processors 604, memory 606, and input and output devices 608. The computing system 600 may be a single device or may include multiple devices connected over a network. The power supply 602 may include a mains supply and/or a battery. The processors 604 may include, for example, one or more of each of a central processing unit (CPU), a graphics processing unit (GPU), and/or a neural processing unit (NPU). Any of these processors may have multiple cores, and various parts of the pipeline described herein may be parallelized between cores and/or between processors. For example, model training may be parallelized across GPU cores. The memory 606 (which in the present disclosure may refer to working memory and/or storage) may store program code for implementing any of the functional components or modules described herein. The program code may be written in any suitable programming language and may make use of any software development framework such as PyTorch and/or Tensorflow. Certain subroutines may further make use of lower layer task-specific and/or hardware-specific frameworks, such as CUDA by Nvidia® or Triton by OpenAI® for model training. The input and output devices 808 may enable a user to interact with a user interface for inspecting or otherwise interacting with.

Figure 7:
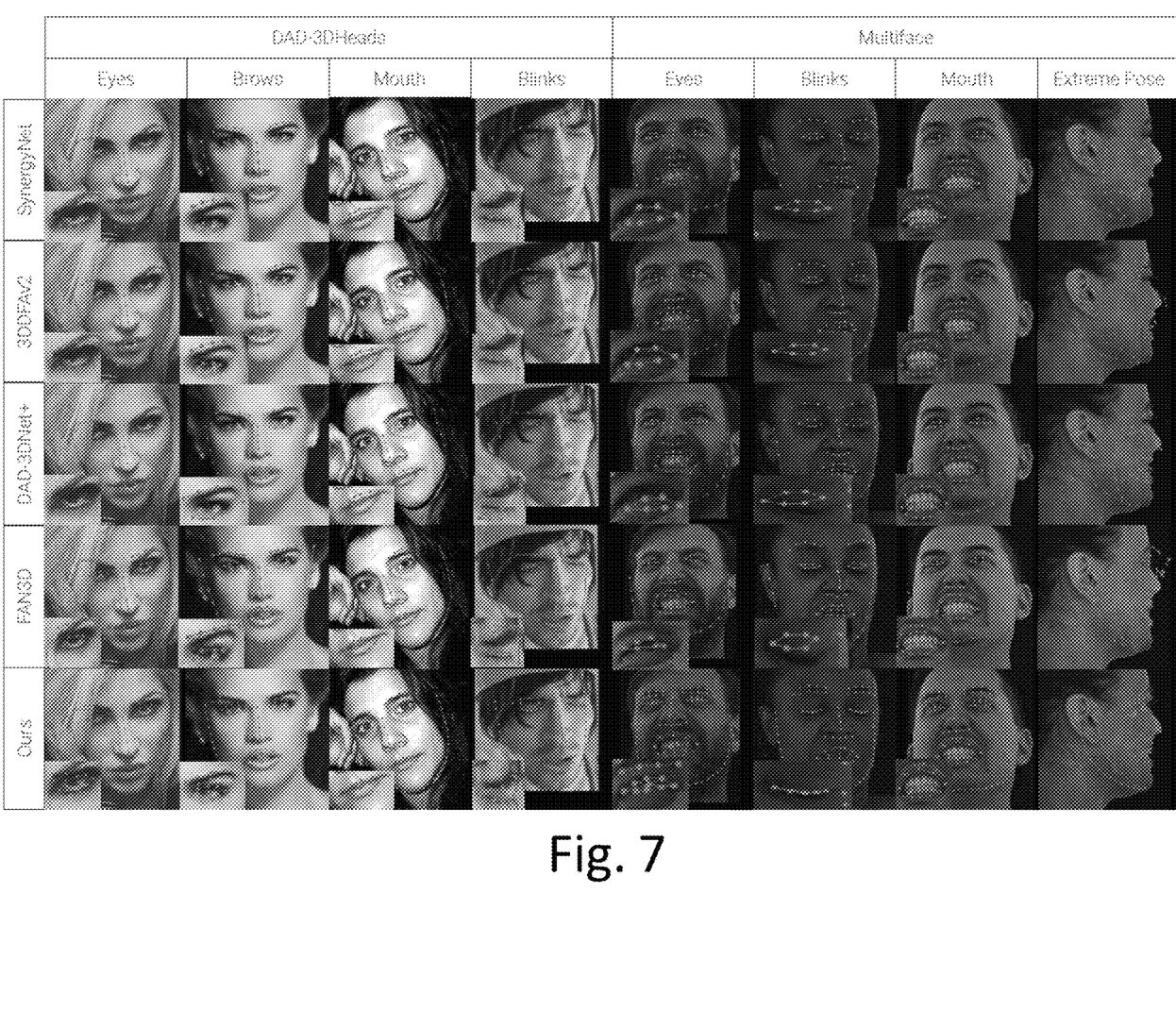
FIG. 7 shows qualitative comparisons between 3D landmarks using various 3D landmark regressors, including one trained using methods as disclosed herein.

FIG. 7 shows projections of 3D landmarks determined by a ViT-based 3D facial landmark regressor trained using the methods described herein ("ours"), along with comparative results generated using four other 3D facial landmark regression models. Results are shown for eight face images exemplifying different facial landmark challenges (as indicated by the column headings and shown in the zoomed insets). The face images are taken from two publicly available datasets: DAD-3DHeads (in-the-wild images) as presented in the article "Dad-3DHeads: A large-scale dense, accurate and diverse dataset for 3D head alignment from a single image" by T Martyniuk et al, *CVPR*, 2022; and Multiface (programmatic synthetic images) as presented in the article "Multiface: A dataset for neural face rendering" by C. Wuu et al, *CoRR*, 2022. The models used for comparison are: SynergyNet as presented in the article "Synergy between 3DMM and 3D landmarks for accurate 3D facial geometry", by C. Wu et al, *3DV*, 2021; 3DDFAv2 as presented in the article "Towards fast, accurate and stable 3d dense face alignment", by J. Guo et al, *ECCV*, 2020; DAD-3DNet+ as presented in the article "3D-aware facial landmark detection via multiview consistent training on synthetic data", by L Zeng et al, *CVPR*, 2023; and Fan3D as presented in the article "How far are we from solving the 2D & 3D face alignment problem? (and a dataset of 230,000 3D facial landmarks)", by A. Bulat et al, *ICCV*, 2017. It is observed that the present landmark regressor qualitatively outperforms the other models, particularly in the presence of blinks and extreme head poses. Furthermore, the present landmark regressor is capable of accurately picking out the visible border of the eyebrows, as opposed to a single line corresponding to a predetermined location on the underlying face topology. This example shows how a 3D landmark regressor trained using the methods described herein can determine 3D landmarks that show 2D-3D consistency with 2D landmarks generated by state-of-the-art 2D landmark regressors.

At least some aspects of the examples described herein with reference to FIGS. 1-7 comprise computer processes or methods performed in one or more processing systems and/or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example a hard disk; optical memory devices in general; etc.

The above embodiments are to be understood as illustrative examples of the invention. Further embodiments of the invention are envisaged. For example, some or all of the disclosed techniques may equally be applied to objects other than human faces, for example to animal faces, entire human or animal bodies, vehicles, etc. Furthermore, the image processing method described with reference to FIG. 4 may be used to train a 3D landmark regressor, independently from the method of FIG. 1.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system comprising:
one or more processors; and
one or more non-transitory computer-readable media storing instructions which, when executed by the one or more processors, cause the one or more processors to perform operations comprising:
rendering a plurality of two-dimensional views of a three-dimensional object generated by a generative model, each two-dimensional view corresponding to a respective ground truth camera pose relative to the three-dimensional object;
processing, using a two-dimensional landmark regressor, the plurality of two-dimensional views to generate respective sets of two-dimensional landmarks;
fitting a set of three-dimensional landmarks to the respective sets of two-dimensional landmarks using the respective ground truth camera poses;
processing, using a three-dimensional landmark regressor, at least a first two-dimensional view of the object to determine a candidate set of three-dimensional landmarks for the first two-dimensional view of the object; and
updating the three-dimensional landmark regressor based at least in part on a loss function comprising a term that evaluates a deviation between the candidate set of three-dimensional landmarks and the fitted set of three-dimensional landmarks.

2. The system of claim 1, wherein the fitting comprises, for a respective set of two-dimensional landmarks:
determining, using the respective ground truth camera pose, a subset of the respective set of two-dimensional landmarks that are unoccluded within the corresponding two-dimensional view of the object; and
updating the three-dimensional landmarks based at least in part on a cost function which evaluates a deviation between the determined subset of two-dimensional landmarks and projections of a corresponding subset of the three-dimensional landmarks.

3. The system of claim 1, wherein:
the first two-dimensional view of the object corresponds to a first ground truth camera pose;
processing the at least first two-dimensional view of the object further determines a candidate camera pose for the first two-dimensional view of the object; and
the loss function comprises a term that evaluates a deviation between the candidate camera pose and the first ground truth camera pose.

4. The system of claim 1, wherein:
the first two-dimensional view of the object corresponds to a first ground truth camera pose;
processing the at least first two-dimensional view of the object further determines a candidate camera pose for the first two-dimensional view of the object;
the operations comprise:
projecting the candidate set of three-dimensional landmarks to two dimensions using the candidate camera pose; and
projecting the fitted set of three-dimensional landmarks to two dimensions using the first ground truth camera pose; and
the loss function comprises a term that evaluates a deviation between the projected candidate set of three-dimensional landmarks and the projected fitted set of three-dimensional landmarks.

5. The system of claim 1, wherein the object is a first object, the candidate set of three-dimensional landmarks is a first candidate set of three-dimensional landmarks, and the operations comprise:
  processing, using the two-dimensional landmark regressor, a first image depicting a second object to determine a first set of two-dimensional landmarks;
  processing, using the three-dimensional landmark regressor, at least the first image to determine a second candidate set of three-dimensional landmarks and a candidate camera pose relative to the second object; and
  projecting at least a subset of the second candidate set of three-dimensional landmarks to two dimensions using the candidate camera pose,
  wherein the loss function comprises a term that evaluates a deviation between the first two-dimensional landmarks and the projected second candidate three-dimensional landmarks.

6. The system of claim 5, wherein:
  the operations comprise determining, using the candidate camera pose, an unoccluded subset of the second candidate set of two-dimensional landmarks; and
  evaluating the deviation between the first two-dimensional landmarks and the projected second candidate three-dimensional landmarks uses the unoccluded subset of second candidate two-dimensional landmarks and a corresponding subset of the first two-dimensional landmarks.

7. The system of claim 5, wherein the at least first image comprises one or more in-the-wild video frames.

8. The system of claim 1, wherein the three-dimensional landmark regressor comprises:
  a vision transformer encoder configured to process an image to generate image tokens, landmarks tokens, and pose tokens;
  a transformer decoder configured to process the generated image tokens, landmark tokens, and pose tokens, the decoder comprising an image-cross-attention layer, a landmark-pose self-attention layer, and a multi-layer perceptron (MLP); and
  respective MLP heads for processing the landmark tokens and the pose tokens to predict three-dimensional landmarks and a three-dimensional pose.

9. The system of claim 1, wherein the three-dimensional object comprises a synthetic human face.

10. The system of claim 1, wherein rendering the plurality of two-dimensional views of the three-dimensional object comprises sampling camera poses from a distribution that is biased towards camera poses corresponding to front-facing views of the three-dimensional object.

11. The system of claim 1, wherein the operations further comprise, after the updating of the three-dimensional landmark regressor, processing one or more images using the three-dimensional landmark regressor to determine a set of three-dimensional landmarks.

12. A computer-implemented method comprising:
  rendering a plurality of two-dimensional views of a three-dimensional object generated by a generative model, each two-dimensional view corresponding to a respective ground truth camera pose relative to the three-dimensional object;
  processing, using a two-dimensional landmark regressor, the plurality of two-dimensional views to generate respective sets of two-dimensional landmarks;
  fitting a set of three-dimensional landmarks to the respective sets of two-dimensional landmarks using the respective ground truth camera poses;
  processing, using a three-dimensional landmark regressor, at least a first two-dimensional view of the object to determine a candidate set of three-dimensional landmarks for the first two-dimensional view of the object; and
  updating the three-dimensional landmark regressor based at least in part on a loss function comprising a term that evaluates a deviation between the candidate set of three-dimensional landmarks and the fitted set of three-dimensional landmarks.

13. The computer-implemented method of claim 12, wherein the fitting comprises, for a respective set of two-dimensional landmarks:
  determining, using the respective ground truth camera pose, a subset of the respective set of two-dimensional landmarks that are unoccluded within the corresponding two-dimensional view of the object; and
  updating the three-dimensional landmarks based at least in part on a cost function which evaluates a deviation between the determined subset of two-dimensional landmarks and projections of a corresponding subset of the three-dimensional landmarks.

14. The computer-implemented method of claim 12, wherein:
  the first two-dimensional view of the object corresponds to a first ground truth camera pose;
  processing the at least first two-dimensional view of the object further determines a candidate camera pose for the first two-dimensional view of the object; and
  the loss function comprises a term that evaluates a deviation between the candidate camera pose and the first ground truth camera pose.

15. The computer-implemented method of claim 12, wherein:
  the first two-dimensional view of the object corresponds to a first ground truth camera pose;
  processing the at least first two-dimensional view of the object further determines a candidate camera pose for the first two-dimensional view of the object;
  the method comprises:
    projecting the candidate set of three-dimensional landmarks to two dimensions using the candidate camera pose; and
    projecting the fitted set of three-dimensional landmarks to two dimensions using the first ground truth camera pose; and
  the loss function comprises a term that evaluates a deviation between the projected candidate set of three-dimensional landmarks and the projected fitted set of three-dimensional landmarks.

16. The computer-implemented method of claim 12, wherein the object is a first object, the candidate set of three-dimensional landmarks is a first candidate set of three-dimensional landmarks, and the method comprises:
  processing, using the two-dimensional landmark regressor, a first image depicting a second object to determine a first set of two-dimensional landmarks;
  processing, using the three-dimensional landmark regressor, at least the first image to determine a second candidate set of three-dimensional landmarks and a candidate camera pose relative to the second object; and projecting the second candidate set of three-dimensional landmarks to two dimensions using the candidate camera pose,
wherein the loss function comprises a term that evaluates a deviation between the first set of two-dimensional landmarks and the projected second candidate set of three-dimensional landmarks.

17. The computer-implemented method of claim 16, comprising:
determining, using the candidate camera pose, an unoccluded subset of the second candidate set of two-dimensional landmarks; and
evaluating the deviation between the first two-dimensional landmarks and the projected second candidate three-dimensional landmarks uses the unoccluded subset of second candidate two-dimensional landmarks and a corresponding subset of the first two-dimensional landmarks.

18. The computer-implemented method of claim 12, wherein the at least first image comprises one or more in-the-wild video frames.

19. The computer-implemented method of claim 12, further comprising, after the updating of the three-dimensional landmark regressor, processing one or more images using the three-dimensional landmark regressor to determine a set of three-dimensional landmarks.

20. One or more non-transitory computer-readable media storing instructions which, when executed by a computer, cause the computer to perform operations comprising:
rendering a plurality of two-dimensional views of a three-dimensional object generated by a generative model, each two-dimensional view corresponding to a respective ground truth camera pose relative to the three-dimensional object;
processing, using a two-dimensional landmark regressor, the plurality of two-dimensional views to generate respective sets of two-dimensional landmarks;
fitting a set of three-dimensional landmarks to the respective sets of two-dimensional landmarks using the respective ground truth camera poses;
processing, using a three-dimensional landmark regressor, at least a first two-dimensional view of the object to determine a candidate set of three-dimensional landmarks for the first two-dimensional view of the object; and
updating the three-dimensional landmark regressor based at least in part on a loss function comprising a term that evaluates a deviation between the candidate set of three-dimensional landmarks and the fitted set of three-dimensional landmarks.

* * * * *